United States Patent
Ito et al.

(10) Patent No.: US 8,034,217 B2
(45) Date of Patent: Oct. 11, 2011

(54) LIQUID CONDENSATION SYSTEM

(75) Inventors: Yuzuru Ito, Tokyo (JP); Yoshishige Endo, Tokyo (JP); Hidekazu Tsudome, Tokyo (JP); Fumiaki Numajiri, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 881 days.

(21) Appl. No.: 12/027,302

(22) Filed: Feb. 7, 2008

(65) Prior Publication Data

US 2008/0230366 A1  Sep. 25, 2008

(30) Foreign Application Priority Data

Feb. 9, 2007  (JP) ................................ 2007-029938

(51) Int. Cl.
*B01D 1/00* (2006.01)
*B01D 3/10* (2006.01)
*B01D 3/42* (2006.01)

(52) U.S. Cl. ......... 202/186; 159/27.3; 159/44; 159/901; 159/DIG. 16; 165/61; 165/287; 202/160; 202/182; 202/202; 202/205; 202/206; 203/2; 203/87

(58) Field of Classification Search ................. 159/27.3, 159/44, 901, DIG. 16, DIG. 23, DIG. 27, 159/DIG. 28, DIG. 40; 165/61, 287; 202/160, 202/182, 186, 202, 205, 206; 203/2, 87, 203/DIG. 18; 432/66
See application file for complete search history.

(56) References Cited

U.S. PATENT DOCUMENTS

| | | | | |
|---|---|---|---|---|
| 3,347,754 A | * | 10/1967 | Thomas | 202/186 |
| 4,670,278 A | * | 6/1987 | Healey et al. | 426/387 |
| 6,117,275 A | * | 9/2000 | Baumann | 203/1 |
| 6,391,162 B1 | * | 5/2002 | Kamiya et al. | 203/11 |
| 7,416,642 B2 | * | 8/2008 | Nadeau et al. | 202/186 |
| 2002/0178604 A1 | * | 12/2002 | Gmeiner et al. | 34/77 |
| 2006/0231378 A1 | * | 10/2006 | Wolfgang et al. | 202/176 |

FOREIGN PATENT DOCUMENTS

| | | |
|---|---|---|
| JP | 3011254 | 3/1995 |
| JP | 2004-167433 | 6/2004 |
| JP | 2004-344700 | 12/2004 |

OTHER PUBLICATIONS

JP Search Report of Appln. 2007-029938 Dec. 21, 2010 with partial translation.

* cited by examiner

*Primary Examiner* — Virginia Manoharan
(74) *Attorney, Agent, or Firm* — Antonelli, Terry, Stout & Kraus, LLP.

(57) ABSTRACT

A liquid condensation system heats a liquid raw material under a decompressed circumstance and evaporates a volatile component from a liquid surface to condense the liquid raw material. Therefore, the liquid condensation system includes: liquid condensers, each of which condenses the liquid raw material; a vacuum pump that is in communication with the liquid condensers; and a warm water circulation system as a heating source that heats the liquid raw material in the liquid condensers. The volatile component evaporated in the liquid condensers is led to the outside of the liquid condensers through vapor lines. The condensed liquid that is not evaporated in the liquid condensers is led to the outside of the liquid condensers through condensed-liquid lines. Condensed-liquid-line adjusting valves are interposed on the condensed-liquid lines, and heaters are attached to the condensed-liquid lines. A control unit controls the heaters and the condensed-liquid-line adjusting valves.

8 Claims, 7 Drawing Sheets

LIQUID RAW MATERIAL

FIG.6B

EVAPORATED VOLATILE COMPONENT

FIG.7

LIQUID CONDENSATION SYSTEM

The present application claims priority from Japanese application JP2007-29938 filed on Feb. 9, 2007, the content of which is hereby incorporated by reference into this application.

BACKGROUND OF THE INVENTION

The present invention relates to a liquid condensation system that condenses a liquid by evaporation from a liquid surface.

A conventional technique of condensing a liquid is disclosed in Japanese Unexamined Patent Application Publication No. 2004-344700. In a decompression-evaporation condensation apparatus disclosed in Japanese Unexamined Patent Application Publication No. 2004-344700, a cooling condensation chamber that cools and condenses vapor supplied from an evaporation boiling can is provided above the evaporation boiling can that generates vapor of a processed liquid, so that a nonvolatile component in the processed liquid is not mixed into evaporated, condensed water. In addition, mist removing means is provided for a vapor passage so that a liquid or a solid in the evaporation boiling can does not reach the cooling condensation chamber.

Another example of the liquid condensation is disclosed in Japanese Unexamined Patent Application Publication No. 2004-167433. In a heating vaporization apparatus disclosed in Japanese Unexamined Patent Application Publication No. 2004-167433, a double cylinder composed of an inner cylinder and an outer cylinder is provided with a liquid permeation plate at an outer circumference of the inner cylinder. The liquid permeation plate is formed by using a porous material, and a gap extending in the horizontal direction is formed under a liquid-supplied position provided at an upper portion of the liquid permeation plate. By heating the inside of the inner cylinder, a liquid supplied to an upper portion of the liquid permeation plate is vaporized.

When condensing a liquid, improvement of heating efficiency and reduction of a condensation time are required. In the decompression-evaporation condensation apparatus disclosed in Japanese Unexamined Patent Application Publication No. 2004-344700, there is a possibility that a hot spot where a temperature is higher than those of surrounding areas is formed in the vicinity of a wall face of a container into which a heater is introduced. When the heat spot is formed, it is impossible to uniformly heat the inside of the container, thus reducing heating efficiency.

Further, in order to uniformly heat the inside of the container, it is necessary to reduce the container in size. However, if the container is reduced in size, an area of a vapor-liquid interface necessary for evaporation of a liquid is reduced, and an evaporation amount is decreased, thus increasing a time required for condensation. That is, it is difficult to achieve improvement of heating efficiency and reduction of a condensation time at the same time.

In the heating vaporization apparatus disclosed in Japanese Unexamined Patent Application Publication No. 2004-167433, the porous liquid-permeation-plate is heated from the inside of the inner cylinder provided on an outer surface, thus improving vaporization efficiency. However, in the porous liquid-permeation-plate, there is a possibility of causing a trouble that a separated material once vaporized is mixed into a separated material in a liquid state that is supplied from a supplying pipe, and is condensed to be changed into a liquid state again, thus reducing separation efficiency.

BRIEF SUMMARY OF THE INVENTION

The present invention is achieved in view of the problems in the conventional techniques, and an object thereof is to efficiently heat a liquid in a short time by using a liquid condensation system. Another object of the present invention is to automatically and efficiently perform a condensation process of a liquid by using a liquid condensation system.

A characteristic of the present invention to achieve the above-described objects is a liquid condensation system that heats a liquid raw material under a decompressed circumstance and evaporates a volatile component from a liquid surface to condense the liquid raw material, the system including: liquid condensers, each of which condenses the liquid raw material; a vacuum pump that is in communication with the liquid condensers; a warm water circulation system as a heating source that heats the liquid raw material in the liquid condensers; vapor lines through which the volatile component evaporated in the liquid condensers is led to the outside of the liquid condensers; condensed-liquid lines through which the condensed liquid that is not evaporated in the liquid condensers is led to the outside of the liquid condensers; condensed-liquid-line adjusting valves that are interposed on the condensed-liquid lines; heating means that is attached to the condensed-liquid lines; and a control unit that controls the heating means and the condensed-liquid-line adjusting valves.

In the characteristic, it is desirable that each of the liquid condensers has a double-cylinder structure having an outer pipe and an inner pipe, and is structured in such a manner that: the axis of the cylinder is arranged in a vertical axis direction; a cylindrical space where a fluid led from the warm water circulation system flows is formed between the outer pipe and the inner pipe; plural grooves extending in the axis direction are formed on an inner circumferential face of the inner pipe; a hollow vapor-discharge-pipe, one end of which protrudes inside a processing space that is formed inside the inner pipe and the other end of which extends to the outside from the inner pipe, is arranged at a lower portion of the inner pipe; a supplying pipe through which the liquid raw material is supplied to the groove portions of the inner pipe is formed at an upper portion of the inner pipe; a condensed-liquid discharge pipe through which the separated condensed liquid is discharged is provided at a position that is located at a lower portion of the inner pipe and is different from that where the vapor discharge pipe is arranged; the vapor line is connected to the vapor discharge pipe; and the condensed-liquid line is connected to the condensed-liquid discharge pipe.

Further, it is desirable that an upper lid for a groove-formed pipe that is engaged with an upper end of the inner pipe is provided, plural land portions are arranged in a radial manner on an upper surface of the upper lid for the groove-formed pipe, a buffer portion is formed in the middle of the plural land portions, the condensed-liquid line further includes a condensed-liquid tank and a discharge pump that supplies the condensed liquid stored in the condensed-liquid tank to the outside, further includes temperature-adjusting temperature sensors that are provided between the liquid condensers and the condensed-liquid-line adjusting valves, between the condensed-liquid-line adjusting valves and the condensed-liquid tank, and to the condensed-liquid tank, and the control unit controls the heating means and the condensed-liquid-line adjusting valves on the basis of outputs from the temperature-adjusting temperature sensors.

Further, a backflow prevention cover formed in an umbrella shape may be attached to an end portion of the vapor discharge pipe on the liquid condenser-side. Plural the liquid condensers may be provided and may be operable in parallel.

Another characteristic of the present invention to achieve the above-described objects is a liquid condensation system that heats a liquid raw material under a decompressed circumstance and evaporates a volatile component from a liquid surface to condense the liquid raw material, the system including: liquid condensers, each of which condenses the liquid raw material; a vacuum pump that is in communication with the liquid condensers; a warm water circulation system as a heating source that heats the liquid raw material in the liquid condensers; a raw material buffer from which the liquid is fed to each liquid condenser; a raw material supplying pump that supplies the raw material to the raw material buffer; vapor lines through which the volatile component evaporated in each of the liquid condensers that are connected in parallel to the raw material buffer is led to the outside of the liquid condensers; condensed-liquid lines through which the condensed liquid that is not evaporated in the liquid condensers is led to the outside of the liquid condensers; condensed-liquid-line adjusting valves that are interposed on the condensed-liquid lines; a temperature-adjusting heater that is attached to the condensed-liquid lines; and a control unit that controls the temperature-adjusting heater and the condensed-liquid-line adjusting valves.

In the characteristic, it is desirable that each of the liquid condensers has a structure having an outer pipe and an inner pipe overlapped, and is structured in such a manner that: warm water is led from the warm water circulation system to between the outer pipe and the inner pipe; the inside of the inner pipe is made to be under a decompressed circumstance by using the vacuum pump; the liquid raw material in a thin membrane state that falls along plural fine grooves that are formed on an inner circumference of the inner pipe and extend in the axis direction is evaporated at a low temperature with the warm water; and generated vapor is led to a vapor discharge pipe inserted into the inner pipe and a non-evaporated liquid is led to a condensed-liquid discharge pipe arranged at a lower portion of the inner pipe for condensation of the liquid raw material.

Further, it is desirable that each of the liquid condensers is structured in such a manner that an upper lid for a groove-formed pipe that accepts a supplied liquid is arranged at an upper end of the inner pipe, plural fine grooves in a radial manner are formed on the upper lid for the groove-formed pipe, the liquid is fed to the whole circumference of the inner pipe by using capillary phenomenon, and substantially uniform thin membranes are formed in the fine grooves formed on an inner circumferential face of the inner pipe.

According to the present invention, since power necessary for feeding the liquid to the fine grooves is provided, a static condenser that allows for stable condensation can be obtained. Further, since the thin membranes of the liquid are formed at the bottoms of the fine grooves, it is possible to facilitate heat transfer, improve heating efficiency, and reduce a condensation time.

DETAILED DESCRIPTION OF THE INVENTION

Hereinafter, an example of a liquid condensation system according to the present invention will be described by using the drawings. In the following description, there will be exemplified a case where the system is applied to production of vinegar, but an object to be condensed is not limited to vinegar. It is desirable that an object to be condensed is higher in the boiling point than a volatile component.

Figure 1:
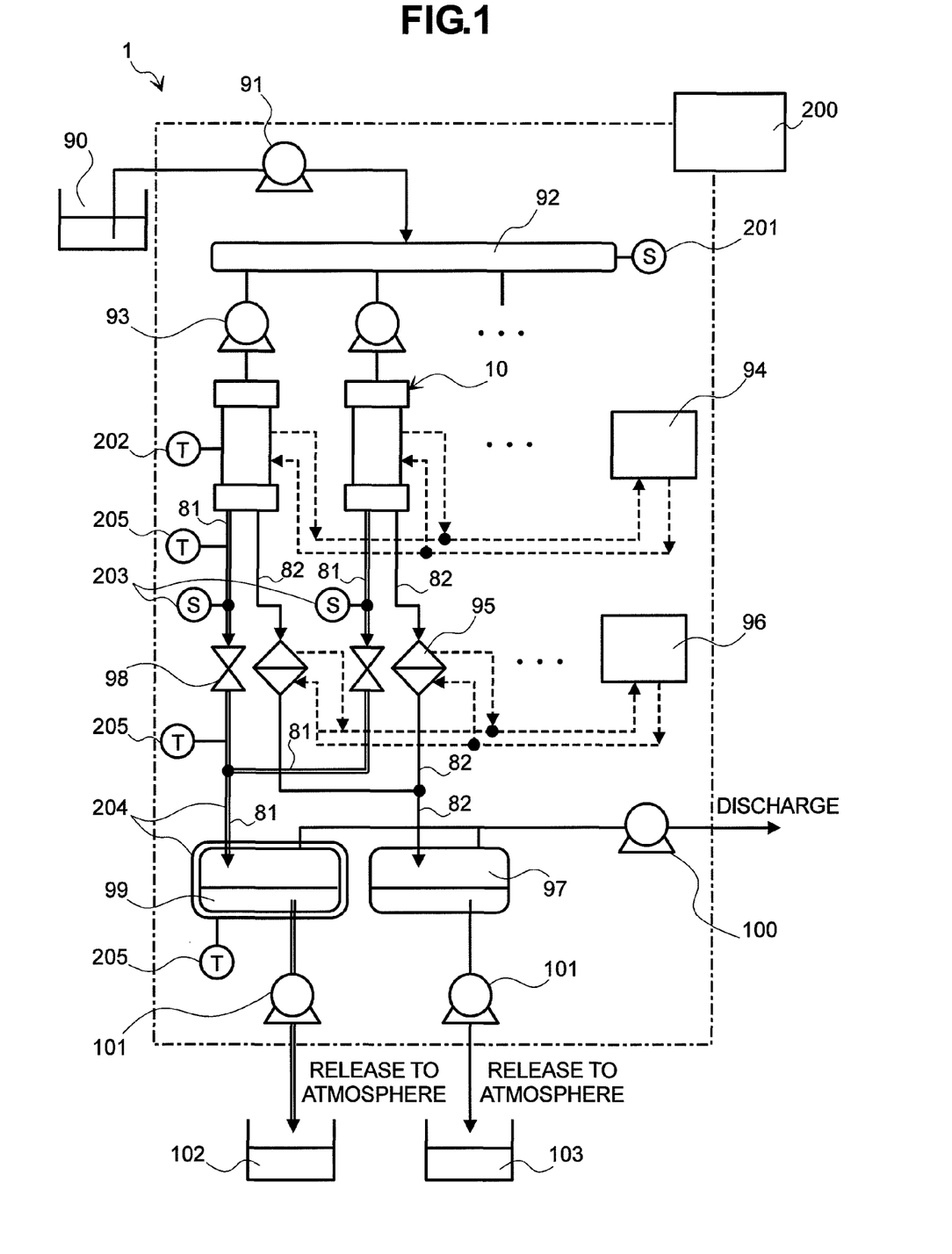
FIG. 1 is a block diagram showing an embodiment of a liquid condensation system according to the present invention.

FIG. 1 is a block diagram showing an embodiment of a liquid condensation system 1. The liquid condensation system 1 includes plural liquid condensers 10 that condense a liquid by evaporating a volatile component contained in the supplied liquid. To each of the liquid condensers 10, there are connected a raw material tank 90 that accommodates therein a liquid raw material prior to condensation, and a raw material supplying pump 91 that supplies the liquid raw material stored in the raw material tank 90 to the liquid condensers 10. It should be noted that plural liquid condensers 10 are provided, but the number of the raw material tanks 90 and the raw material supplying pumps 91 may be one or more in accordance with the capabilities of the liquid condensers 10 in the whole liquid condensation system 1.

In order to supply the liquid raw material to each of the liquid condensers 10 at a constant flow rate, the liquid raw material discharged from the raw material supplying pump 91 is temporarily stored in a raw material buffer 92 provided on the upstream side of the respective liquid condensers 10. Between the raw material buffer 92 and the liquid condensers 10, there are provided flow-rate adjusting pumps 93, each of which is arranged for each liquid condenser 10 and feeds the liquid raw material to each liquid condenser 10 at a desired flow rate. As will be described later in detail, the liquid raw material is condensed in the liquid condensers 10 by using heated water supplied from outside, so that a warm water circulation system 94 is attached to the liquid condensers 10 and high-temperature water supplied from the warm water circulation system 94 flows through flow channels 41 formed inside the liquid condensers 10 to return to the warm water circulation system 94.

In the liquid condensers 10, vapor of a volatile component that is separated from the liquid raw material by using the high-temperature water flows into vapor lines 82 connected to bottom portions of the liquid condensers 10. Along the vapor lines 82, there are arranged heat exchangers 95, each of which cools the vapor of the volatile component discharged from the liquid condensers 10 into its dew point or lower for liquefaction. Cooling water is supplied from a cooling water circulation system 96 to the heat exchangers 95 so as to perform heat exchange between the vapor of the volatile component and the cooling water. The volatile component that is liquefied by heat exchange with the cooling water is fed and stored in a vapor liquid tank 97.

On the other hand, the condensed liquid that is condensed by the liquid condensers 10 is led to condensed-liquid lines 81 connected to bottom portions of the liquid condensers 10.

Along the condensed-liquid lines 81, there are provided condensed-liquid-line adjusting valves 98 so as to adjust the concentration of the condensed liquid and prevent the vapor of the volatile component, which is separated by the liquid condensers 10, from flowing back to the condensed-liquid lines 81. The condensed liquid that flows through the condensed-liquid lines 81 is stored in a condensed-liquid tank 99.

In order to decompress the flow channels from the raw material buffer 92 arranged on the upstream side of the respective liquid condensers 10 to the vapor liquid tank 97 and the condensed-liquid tank 99 arranged on the downstream side of the liquid condensers 10, a vacuum pump 100 is connected to the vapor liquid tank 97 and the condensed-liquid tank 99. The vacuum pump 100 decompresses the flow channels from the downstream side so as to adjust the flow channels into a vacuum atmosphere and facilitate the fluidity of the condensed liquid and the fluid volatile component.

Each of discharge pumps 101 and 101 is connected to the vapor liquid tank 97 and the condensed-liquid tank 99 so as to discharge, to the atmosphere, each liquid from the vapor liquid tank 99 and the condensed-liquid tank 97 that are under the vacuum atmospheres. The condensed liquid that is stored in the condensed-liquid tank 99 and discharged by the discharge pump 101 is stored in a storage container 102. As similar thereto, the liquid volatile component that is stored in the vapor liquid tank 97 and discharged by the discharge pump 101 is stored in a storage container 103.

In the liquid condensation system 1 thus configured, a control unit 200 that is configured by a small personal computer controls a portion enclosed by the chained line in FIG. 1. At this time, the control unit 200 controls the respective valves 98, the respective pumps 91, 93, and 101, and the amount of heat exchange of each heat exchanger 95 on the basis of detection signals of respective sensors. The sensors include a water level sensor 201 that is attached to the raw material buffer 92 to measure a water level in the raw material buffer 92, a condenser-temperature sensor 202 that measures the temperature of each liquid condenser 10, concentration sensors 203 that measure the concentration of the condensed liquid, and temperature-adjusting temperature sensors 205 that detect the temperature of the condensed liquid that flows inside the respective condensed-liquid lines 81.

Each of the temperature-adjusting temperature sensors 205 is attached between the liquid condenser 10 and the condensed-liquid-line adjusting valve 98, between the condensed-liquid-line adjusting valve 98 and the condensed-liquid tank 99, and to the condensed-liquid tank 99. As shown by the double lines in FIG. 1, temperature-adjusting heaters 204 are attached to the condensed-liquid line 81 and the condensed-liquid tank 99 in order to adjust each temperature of the condensed-liquid line 81 and the condensed-liquid tank 99.

In the liquid condensation system 1 thus configured according to the embodiment, vinegar that is an object to be condensed is supplied to the raw material buffer 92 from the raw material tank 90 by the raw material supplying pump 91. For the raw material supplying pump 91, there is used a tube pump in which a tube is squeezed by a roller arranged at a circumference so as to feed the liquid. Since the tube pump is used, the roller closes the tube when no liquid is fed. As a result, a pressure difference generated by the vacuum pump 100 can prevent supplying of an excessive amount of liquid.

The raw material buffer 92 is formed in a pipe shape, and has a cylindrical shape with its both ends closed. Plural connecting joints (not shown) to be connected to the liquid condensers 10 are provided for the raw material buffer 92, so that plural liquid condensers 10 can be attached thereto in parallel. Since plural connecting joints are provided, the number of the liquid condensers 10 can be easily increased or decreased in accordance with the processing amount of the liquid. In the following description, there will be exemplified a case where two of the liquid condensers 10 are attached to the raw material buffer 92.

When a predetermined amount of vinegar is supplied from the raw material tank 90 to the raw material buffer 92, the water level sensor 201 attached to the raw material buffer 92 detects the liquid level of the vinegar that is a raw material. The detection signal of the water level sensor 201 is transmitted to the control unit 200. The control unit 200 actuates the flow-rate adjusting pumps 93 after confirming that the liquid level indicates a predetermined value or larger. Then, the control unit 200 controls the raw material pump 91 and the flow-rate adjusting pumps 93 so that the liquid level in the raw material buffer 92 reaches a predetermined height while feeding a predetermined amount of the liquid. Thereby, it is possible to balance between a supplying amount of vinegar, which is a raw material, from the raw material tank 90 and a discharge amount thereof to the liquid condensers 10. That is, it is possible to equalize the amounts of the liquid supplied to the liquid condensers 10.

The inside of each liquid condenser 10 is decompressed by the vacuum pump 100. In addition, each liquid condenser 10 is heated, not from its center portion, but from a portion between inner and outer circumferential faces by the warm water supplied from the warm water circulation system 94, resulting information of a circumstance in which the volatile component contained in the liquid can be evaporated at a temperature of 100° C. or lower. In an example where water is to be boiled, a high temperature of 100° C. is required under a normal pressure. Amino acid contained in vinegar is altered at a temperature of 70° C. or higher. Thus, vinegar cannot be used in a case where a high-temperature circumstance at 100° C. is required.

In the embodiment, the vacuum pump 100 is provided on the outlet side of the liquid condensation system 1, and the flow channels in the liquid condensation system are decompressed. Accordingly, a boiling point is lowered for low-pressure evaporation. It should be noted that the warm water is used as a heating source for the liquid condensers 10 in the embodiment, but vapor (high-temperature vapor or decompressed low-temperature vapor) may be used instead of the warm water if higher heat energy is necessary. The condenser-temperature sensor 202 that measures the temperature of the inside of each liquid condenser 10 is attached to the liquid condenser 10. In the case where the temperature of the liquid condenser 10 is about to exceed 70° C. due to changes in the processing amount or the like, the control unit 200 controls the warm water circulation system 94 so as to lower the temperature of the warm water.

As will be described later in detail, inside the liquid condensers 10, the evaporated volatile component is separated from the condensed liquid that remains in a liquid state. The vapor of the volatile component and the condensed liquid that are separated from each other are led to the downstream side because the flow channels are decompressed by the vacuum pump 100 and the flow-rate adjusting pumps 93 provided between the liquid condensers 10 and the raw material buffer 92 increase a pressure.

The evaporated volatile component that mainly includes water flows into the heat exchangers 95, and is concentrated by heat exchange with the cooling water supplied from the cooling water circulation system 96. Accordingly, the evaporated volatile component becomes again a liquid state and is stored in the vapor liquid tank 97. On the other hand, the condensed liquid is led to the condensed-liquid tank 99, as it is, for storage. At this time, the concentration sensors 203 provided for the condensed-liquid lines 81 detect the concentration of the condensed liquid, and transmits the detection signal to the control unit 200.

The control unit 200 appropriately opens or closes the condensed-liquid-line adjusting valves 98 provided for the condensed-liquid lines 81. For the vapor lines 82, the resistance of each condensed-liquid line 81 is changed and the flow rate of the condensed liquid is adjusted. Thus, the concentration of the condensed liquid is adjusted to a predetermined value. When the flow rate of the vinegar that passes through the liquid condensers 10 is reduced by closing the condensed-liquid-line adjusting valves 98, the concentration of the condensed liquid is increased. On the contrary, when the flow rate thereof is increased by opening the condensed-liquid-line adjusting valves 98, the concentration of the condensed liquid is decreased.

Further, if the resistance of each condensed-liquid line 81 is made larger than that of each vapor line 82, the vapor is prevented from flowing back, and thus the vapor-liquid separation can be reliably achieved. In the case where vinegar is used as a raw material, the color thereof becomes darker in proportion to an increase in concentration. In the embodiment, absorptiometric sensors are used for the concentration sensors 203. In the case of using the absorptiometric sensors, a relation between the concentration and absorption degree of a condensed liquid that is sampled in advance for each concentration is obtained, and the condensed-liquid-line adjusting valves 98 are controlled in accordance with the relation.

In the above description, there has been explained a case where the specific volatile component is extracted from the raw liquid for condensation. However, a mixed liquid including liquids whose boiling points are different from each other may be used as a liquid to be condensed. In this case, a liquid whose boiling point is lower serves as a volatile component, and another liquid whose boiling point is higher serves as a nonvolatile component.

The vapor liquid that is collected from each liquid condenser 10 and stored in the vapor liquid tank 97 is finally carried to the storage container 103 under the atmosphere by the discharge pump 101. In addition, the condensed liquid that is stored in the condensed-liquid tank 99 is finally carried to the storage container 102 under the atmosphere by the discharge pump 101. Thus, the liquid condensation process is finished. In the case where vinegar is condensed to a predetermined concentration or more, the viscosity becomes higher, resulting in difficulty of liquid feeding.

In order to eliminate this problem, the temperature-adjusting heaters 204 are attached to the condensed-liquid line 81 that reaches the storage container 102 from the liquid condensers 10 via the discharge pump 101, and the condensed-liquid tank 99. The condensed liquid is heated by the temperature-adjusting heaters 204 to lower the viscosity of the condensed liquid and to increase the fluidity, thus facilitating liquid feeding. The temperature of each temperature-adjusting heater 204 is controlled by the control unit 200 on the basis of information from the temperature-adjusting temperature sensors 205.

Figure 2:
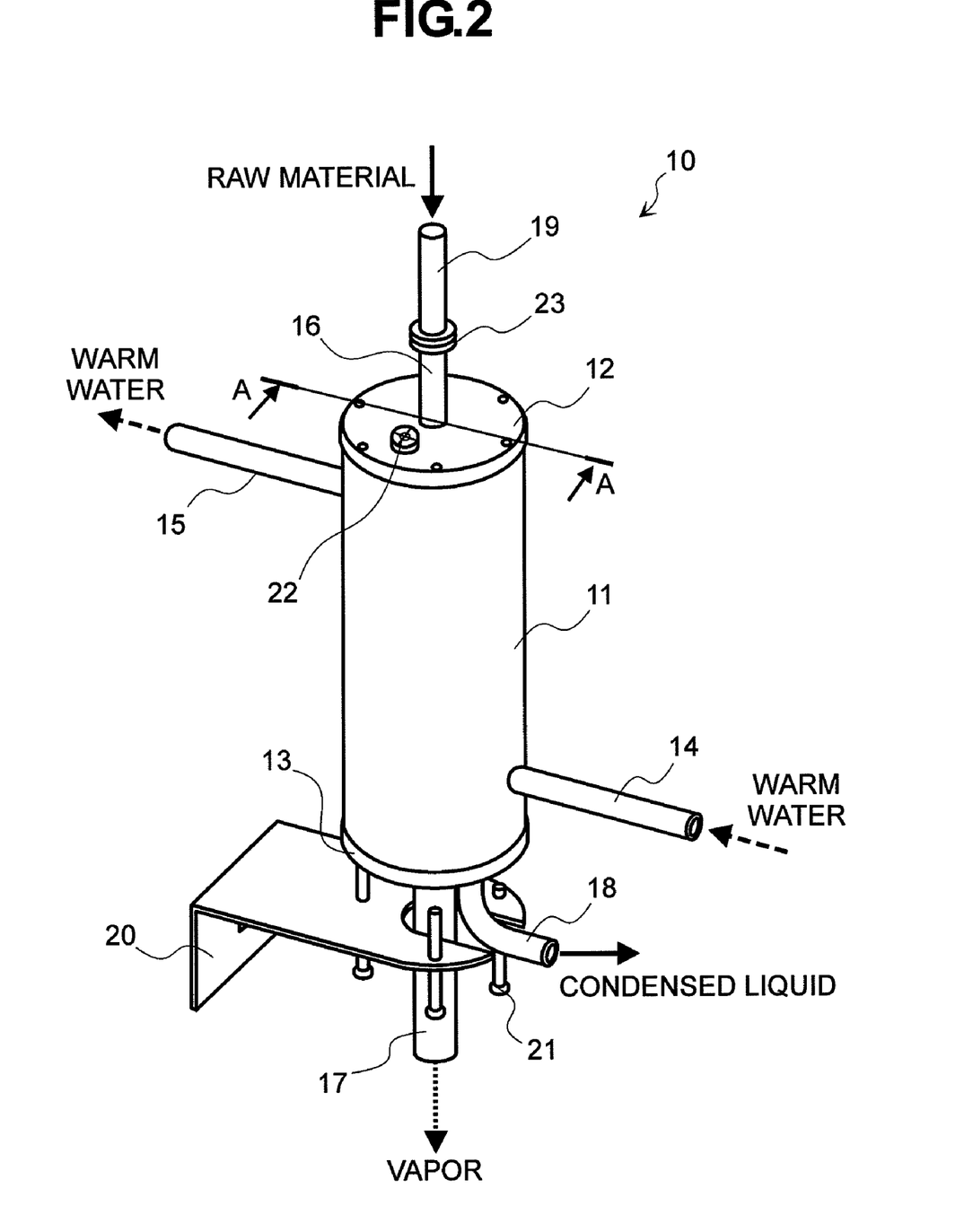
FIG. 2 is a perspective view of a liquid condenser used for the liquid condensation system.

The liquid condensers 10 used for the liquid condensation system 1 shown in FIG. 1 will be described in detail by using FIG. 2 and others. FIG. 2 is an exterior perspective view of the liquid condenser 10. The liquid condenser 10 has a cylindrical shape in which an upper lid 12 and a lower lid 13 are attached to a pipe-shaped outer pipe 11 by using screws for closure, and is arranged so that the axis of the cylinder is directed in the vertical direction as shown in FIG. 2.

A warm water supplying pipe 14 that serves as an inlet of warm water is attached to a lower lateral portion of the outer pipe 11. A warm water discharge pipe 15 that serves as an outlet of warm water is attached to an upper lateral portion of the outer pipe 11. The warm water supplied from the warm water circulation system 94 (see FIG. 1) is led to the inside of the outer pipe 11 from the warm water supplying pipe 14 attached to the lower lateral portion of the outer pipe 11 to circulate inside the liquid condenser 10, and then heat the vinegar as a raw material that is fed from the flow-rate adjusting pump 93.

A raw material supplying pipe 16 is attached to the upper lid 12. The vinegar that is a condensation target stored in the raw material tank 90 is supplied inside the liquid condenser 10 via the raw material supplying pipe 16. A vapor discharge pipe 17 and a condensed-liquid discharge pipe 18 are attached to the lower lid 13. The vapor separated in the liquid condenser 10 is led from the vapor discharge pipe 17 to the subsequent units. In addition, the condensed liquid separated in the liquid condenser 10 is led from the condensed-liquid discharge pipe 18 to the subsequent units. A pipe screw is formed at a tip end of each pipe so as to facilitate connection with other devices.

It is desirable that the liquid condenser 10 be vertically arranged without providing inclination, the reason of which will be described later. In the embodiment, as a pipe for connecting the flow-rate adjusting pump 93 to the raw material supplying pipe 16, a flexible tube 19 for sanitary is used. The liquid condenser 10 is hung by using the flexible tube, so that the liquid condenser 10 is vertically positioned without providing inclination by its own weight.

An L-shaped bracket 20 is arranged at a lower portion of the liquid condenser 10. Three positioning screws 21 are attached to the bracket 20. In addition, a level 22 is attached to an upper surface of the upper lid 12. With confirmation of a vertical state of the liquid condenser 10 by using the level 22, three positioning screws 21 are allowed to abut on a lower surface of the lower lid 13, and the liquid condenser 10 is supported and fixed at three points so as to be vertically positioned. The bracket 20 is fixed to a frame (not shown). A flange 23 (not shown) for sanitary is provided at a tip end of each of the warm water pipes 14 and 15, the condensed-liquid discharge pipe 18, and the vapor discharge pipe 17, thus facilitating connection with other devices.

Figure 3:
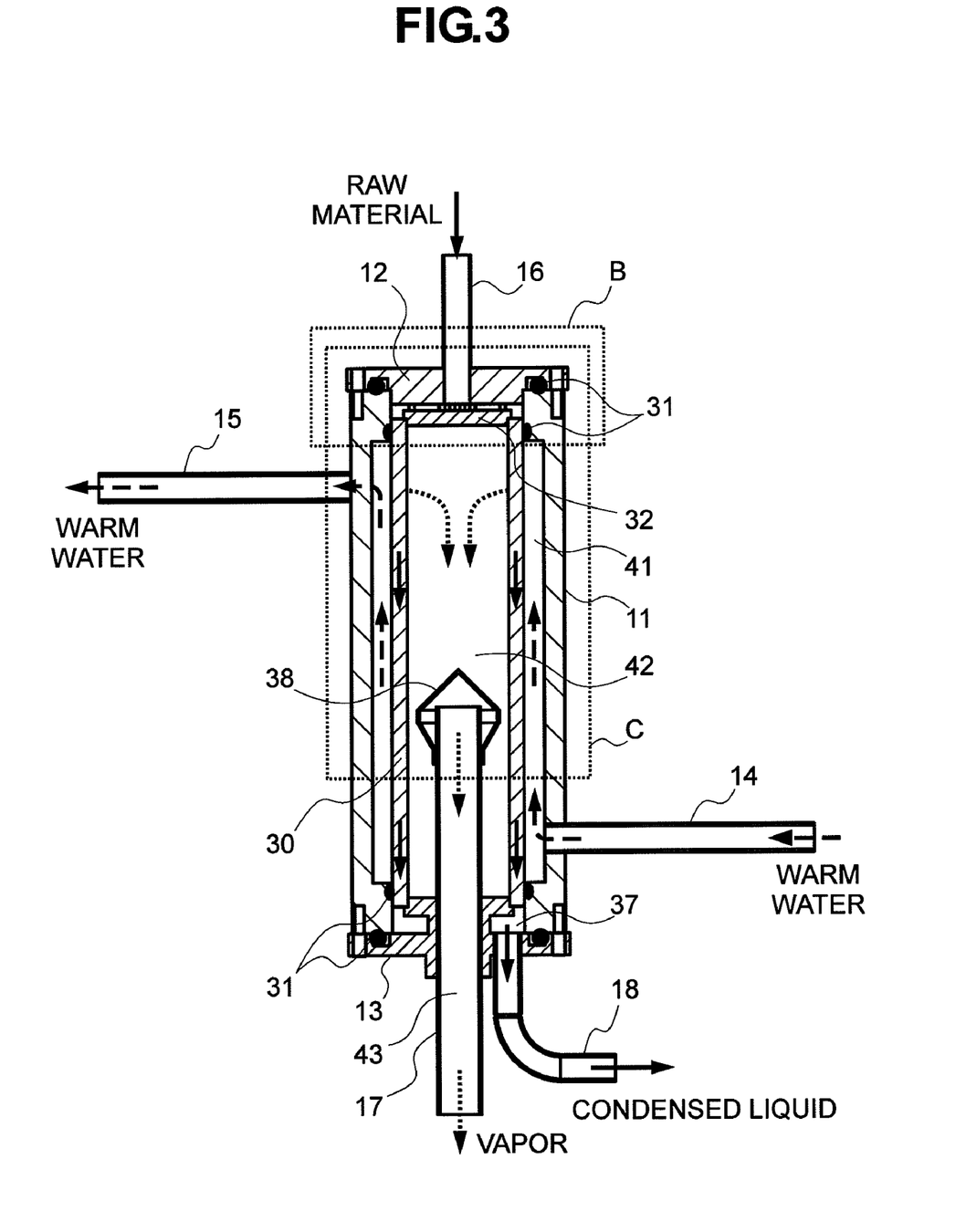
FIG. 3 is a cross sectional view taken along the line A-A shown by the arrows in FIG. 2.

FIG. 3 is a vertical cross sectional view of the liquid condenser 10. FIG. 3 is a cross sectional view taken along the line A-A shown by the arrows in FIG. 2. The liquid condenser 10 includes the outer pipe 11, a groove-formed pipe 30 where the liquid is evaporated, and the vapor discharge pipe 17. These three pipes 11, 30, and 17 form a triple-pipe structure in which the pipes are concentrically arranged. The vapor discharge pipe 17 is fixed at a substantially middle portion of the lower lid 13, and an upper end thereof protrudes to a position slightly lower than the middle in the up-down direction inside the groove-formed pipe 30.

The outer pipe 11 is formed in such a manner that the inner diameters of upper and lower ends thereof are smaller than that of an intermediate portion thereof, and the groove-formed pipe 30 is held by abutting on the small-diameter portions. The lower lid 13 is formed with an I-shaped cross section while having upper and lower flanges, and a lower end of the groove-formed pipe 30 is held by the upper flange. An upper end of the groove-formed pipe 30 is held by an upper lid 32 for the groove-formed pipe that is arranged under the upper lid 12 and abuts on an inner circumferential face of the outer pipe 11.

Inside the liquid condenser 10, there is formed a cylindrical space 41 that vertically extends between an inner circumferential face of the outer pipe 11 and an outer circumferential face of the groove-formed pipe 30. In addition, inside the groove-formed pipe 30, there is formed a processing space 42 where the vinegar that is a raw liquid is condensed and separated. The warm water supplying pipe 14 and the warm water discharge pipe 15 are in communication with the cylindrical space 41. An inner space 43 of the vapor discharge pipe 17 is in communication with the processing space 42, and the inside thereof is maintained in a decompressed circumstance by the vacuum pump 100.

The outer pipe 11 and the groove-formed pipe 30 are sealed to each other by using O rings 31 arranged at abutment portions, so that the liquid contained in the processing space 42 is prevented from flowing into the cylindrical space 41. In the cylindrical space 41, the warm water is circulated from the lower side to the upper side, as shown by the chained arrows in FIG. 3. Accordingly, the groove-formed pipe 30 is uniformly heated, and heat energy necessary for evaporation of the vinegar is applied. Here, it is possible that the inlet and outlet for the warm water are reversely arranged. However, in order to uniformly fill the space with the warm water, the arrangement of the embodiment where the counterflow effect can be expected is more desirable.

Figure 4:
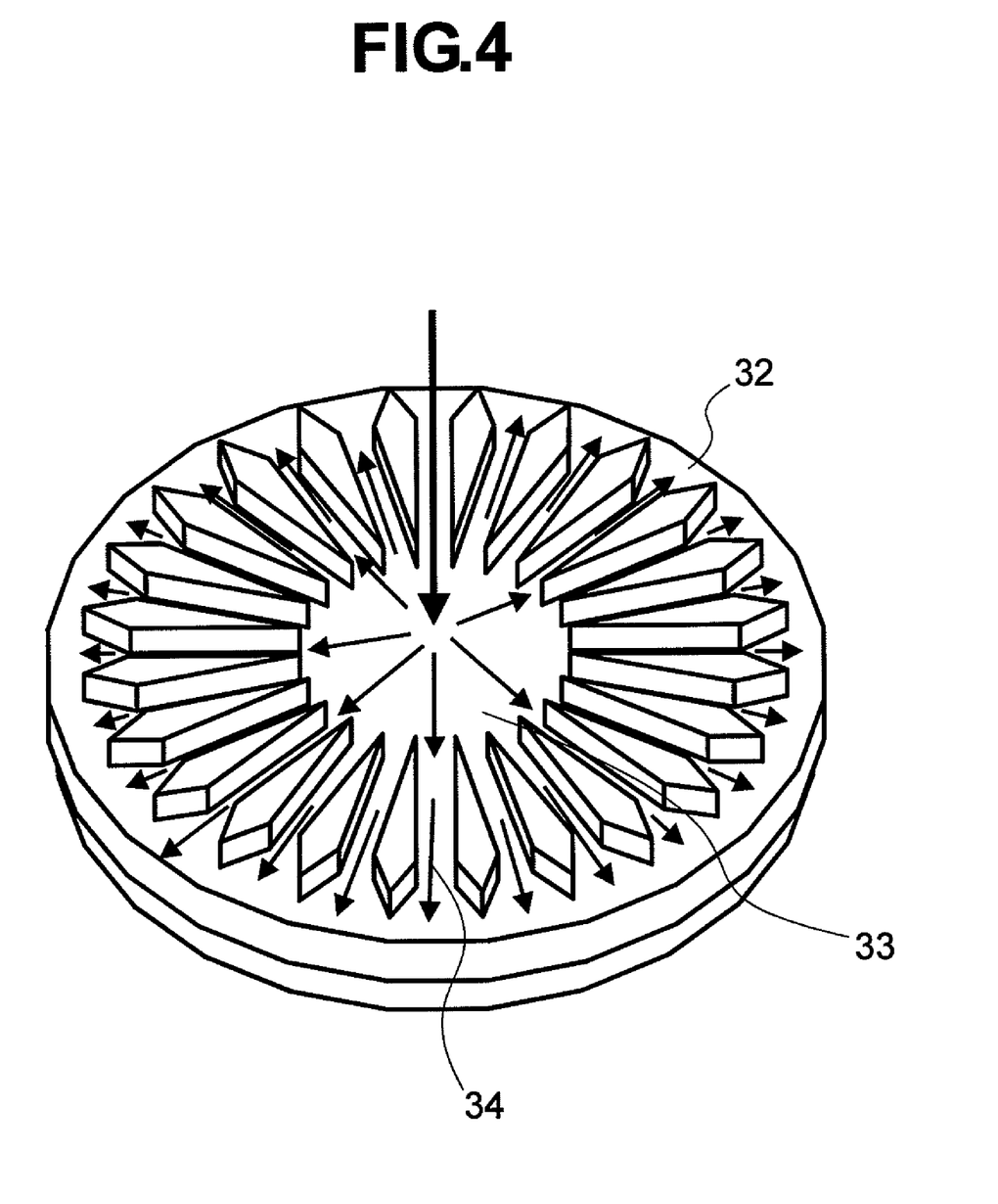
FIG. 4 is a perspective view of an upper lid for a groove-formed pipe included in the liquid condenser.
Figure 5:
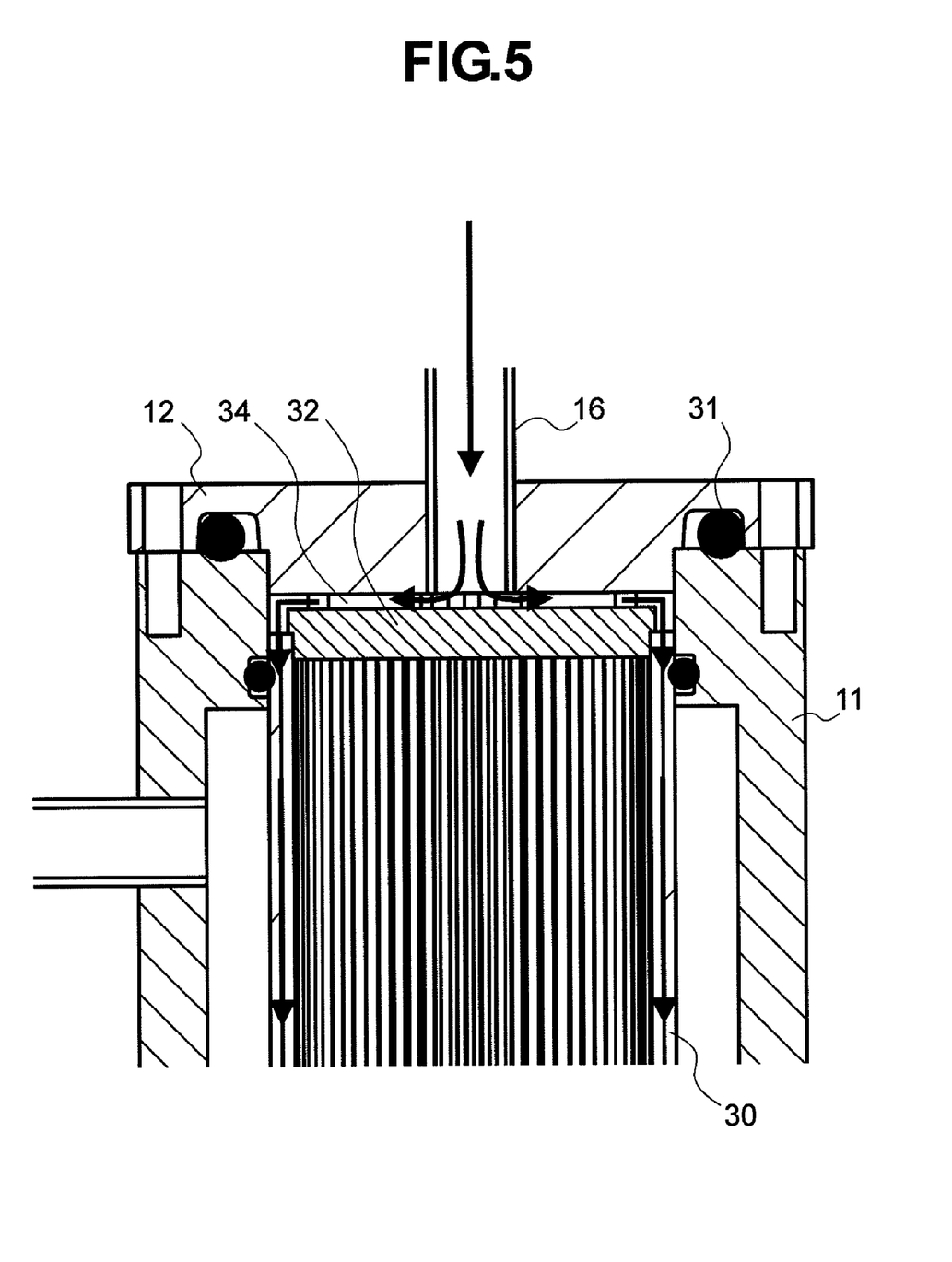
FIG. 5 is an enlarged view of a portion B in FIG. 3.

The detail of the upper lid 12 that serves as a raw material supplying part is shown in FIG. 4. In addition, a portion with which the upper lid 12 is engaged is shown in FIG. 5 by using a partial cross sectional view. FIG. 5 is an enlarged view of a portion B encircled by the dashed line in FIG. 3. As will be described later, in order to efficiently evaporate the liquid in the groove-formed pipe 30, it is necessary to uniformly feed the liquid to the circumference of the groove-formed pipe 30. In the embodiment, the upper lid 32 for the groove-formed pipe that is fitted into the groove-formed pipe 30 is arranged at an upper end of the groove-formed pipe 30, and a buffer portion 33 is formed at a middle portion of an upper surface of the upper lid 32 for the groove-formed pipe.

That is, the upper lid 32 for the groove-formed pipe has plural land portions 32a, which extend in a radial manner, on its upper surface. Each of the land portions 32a has a sword-tip shape in which one apex of a rhombus is extended outside, and liquid-led grooves 34, each extending in the radius direction and having a certain width, are formed between the land portions 32a. An upper surface of the upper lid 32 for the groove-formed pipe abuts on a lower surface of the upper lid 12. By using the upper lid 12 as a lid member, the buffer portion 33 and the liquid-led grooves 34 form the flow channels for the vinegar.

The vinegar discharged from the raw material supplying pipe 16 is fed to the buffer portion 33 formed at a middle portion of the upper lid 32 for the groove-formed pipe, as shown by the arrow lines in FIG. 4. Each of the liquid-led grooves 34 is sufficiently smaller in size than the buffer portion 33, so that the vinegar does not enter the liquid-led grooves 34 until the buffer portion 33 is filled with the vinegar due to the difference of pressure loss.

The vinegar with which the buffer portion 33 is filled is pressurized by vinegar that is pumped without interruption by the flow-rate adjusting pump 93, and is horizontally moved outside in the radius direction while nearly uniformly filling the respective liquid-led grooves 34. When the vinegar reaches an outer circumferential portion of the upper lid 32 for the groove-formed pipe, the flowing direction is changed from the horizontal direction to the vertical direction, and the vinegar is uniformly fed to the circumference of an upper end of the groove-formed pipe 30 that is the subsequent unit. The vinegar that reaches the groove-formed pipe 30 falls along a wall face that configures the groove portions of the groove-formed pipe 30.

In order to uniformly feed the vinegar to the circumference of an upper end of the upper lid 32 for the groove-formed pipe, the upper lid 32 for the groove-formed pipe is maintained in the horizontal direction. That is, it is desirable that the liquid condenser 10 be vertically attached in order to maintain the upper lid 32 for the groove-formed pipe in the horizontal direction. The vertical arrangement of the liquid condenser 10 prevents the liquid from staying therein. Therefore, if a cleaning liquid is fed when cleaning the liquid condenser 10, a remaining liquid can be easily removed, thus facilitating the maintenance therefor.

Figure 6A:
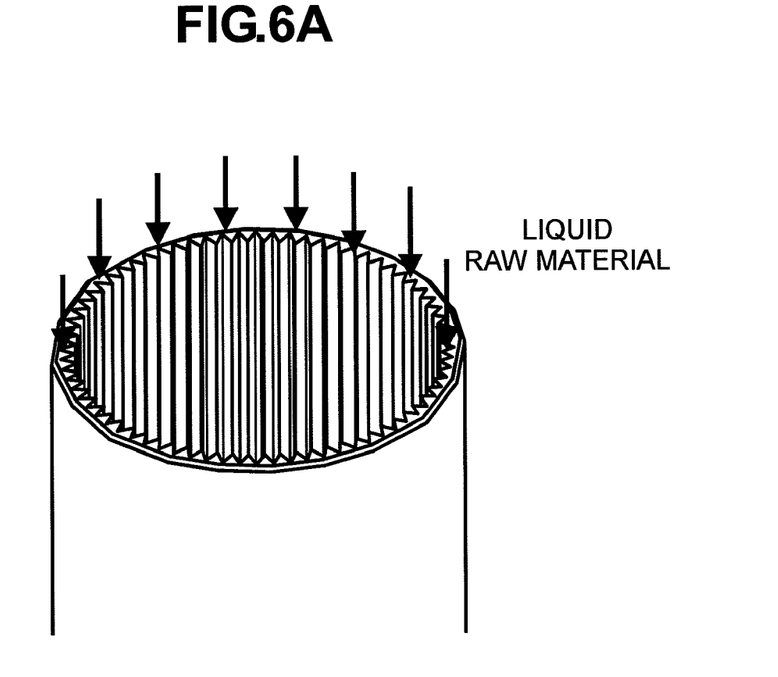
FIG. 6A is a perspective view of a groove-formed pipe included in the liquid condenser shown in FIG. 2.
Figure 6B:
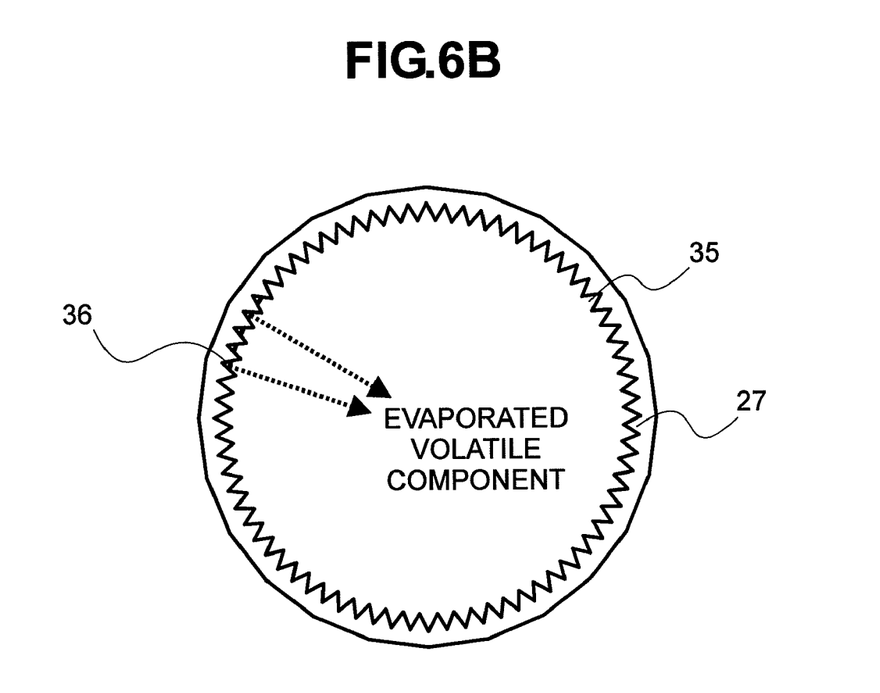
FIG. 6B is a top plan view thereof.

The detail of the groove-formed pipe 30 is shown in FIG. 6. FIG. 6A is a perspective view of an upper end of the groove-formed pipe 30, and FIG. 6B is a top plan view thereof. The groove-formed pipe 30 is configured in such a manner that plural fine grooves 35 are formed at substantially-equal intervals on its inner circumferential face. In the groove-formed pipe 30 used in the embodiment, each of fins 27 that define the grooves 35 has a substantially equilateral-triangle shape with a side of 1.65 mm. The diameter (outer diameter) of the groove-formed pipe 30 is 48 mm, the length thereof in the axis direction is 184 mm, and the number of the grooves 35 is 72.

The vinegar that reaches an upper end of the groove-formed pipe 30 from the upper lid 32 for the groove-formed pipe is trapped by each groove 35 and a wall face of each fin 27 due to the surface tension so as to form a thin membrane 36. Then, the vinegar falls downward along an inner wall face of the groove-formed pipe 30. The cross section of each fine groove 35 may be shaped so that the thin membrane 36 is easily formed (the surface tension enough to hold the liquid in the grooves is secured), and heat transference by which heat energy necessary for evaporation is sufficiently transferred is secured. A rectangular shape, a triangular shape, a semicircular shape, a trapezoidal shape, and the like are used. In the embodiment, the cross section thereof is formed in a equilateral-triangular shape so that the thin membrane 36 is easily formed and work of the fine grooves is easily performed.

The groove-formed pipe 30 is heated by the warm water from the outer circumferential face. Due to the thin membrane of the liquid, the liquid in the fine grooves 35 is high in reactivity to temperature. Further, since the processing space 42 is decompressed, the evaporation starts at a temperature lower than that under the normal pressure. As a result, the volatile component that is contained in the vinegar and mainly includes water evaporates before it reaches a lower end of the groove-formed pipe 30. The amount of evaporation is determined by controlling the supplying amount of the liquid and the temperature of the warm water.

In the embodiment, the vinegar evaporates separately in each of the fine grooves 35, so that the processing amount of the vinegar is in proportion to the number of the grooves 35. That is, if the evaporation amount per one fine groove 35 is once obtained under a certain condition, the liquid condensers 10 with different processing amounts can be easily obtained only by increasing or decreasing the number of the grooves 35. For example, with a result that 50 ml of the liquid is condensed ten times per minute with the number of the grooves 35 set to 20, if the number of the grooves is increased to 40, 100 ml of the liquid can be condensed ten times per minute as long as the conditions such as temperature are the same. In order to equalize the evaporation conditions, the amount of the liquid supplied to each groove 35 needs to be uniform. Therefore, in the embodiment, the buffer portion 33 and the liquid-led grooves 34 are provided on the lid 32 for the groove-formed pipe, so that the amount of the liquid flowing on the inner face of the groove-formed pipe 30 is made uniform in the circumferential direction.

The condensed liquid of the vinegar that remains in a liquid state after evaporating the volatile component flows downward on the inner circumferential face of the groove-formed pipe 30 that forms the grooves 35, as shown by the solid arrows in FIG. 3, and moves from the grooves 35 to a condensed-liquid buffer portion 37 that is formed between the groove-formed pipe 30 and the lower lid 13. The condensed liquid led to the condensed-liquid buffer portion 37 is stored in the condensed-liquid tank 99 via the condensed-liquid discharge pipe 18.

The evaporated volatile component flows into the space 43 inside the vapor discharge pipe 17 that is in communication with the processing space 42, as shown by the dashed arrows in FIG. 3. In the condensation of the vinegar, the vinegar obtained by liquefying the evaporated volatile component again is used in the name of white vinegar. Thus, it is necessary to reliably prevent the condensed liquid from being mixed into the vapor liquid line 82. Accordingly, the vapor discharge pipe 17 is inserted into the inside of the groove-formed pipe 30 at an appropriate position, and then is connected to the lower lid 13 by welding. Thereby, in the event that the condensed liquid goes beyond the condensed-liquid buffer portion 37 to enter the groove-formed pipe 30, it does not readily flow into the vapor discharge pipe 17. In addition, a backflow prevention cover 38 in a conical shape is provided at a tip end of the vapor discharge pipe 17 so as to further prevent the condensed liquid from entering.

Figure 7:
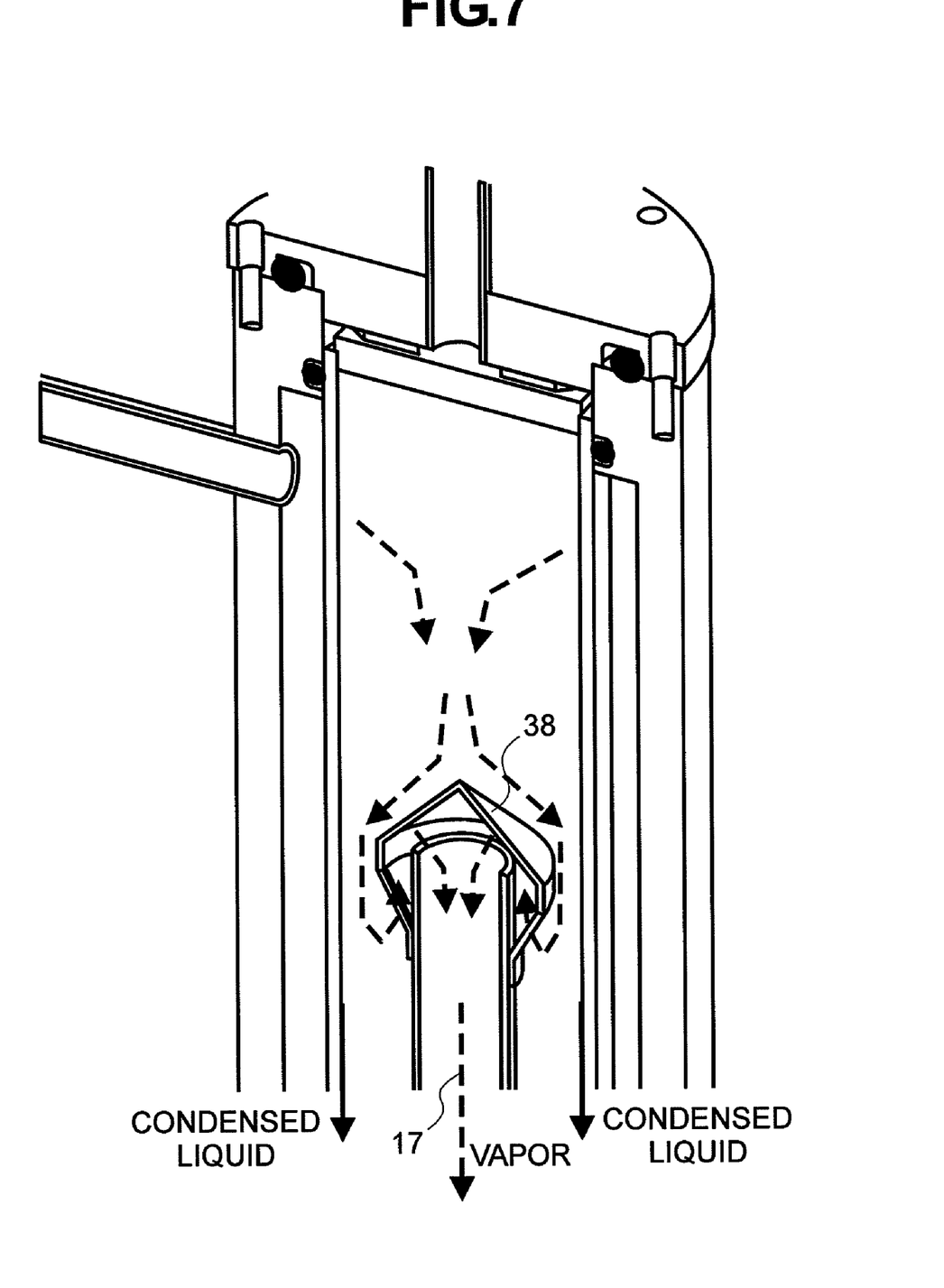
FIG. 7 is a perspective cross sectional view of a portion C in FIG. 3.

In FIG. 7, an upper half portion of the liquid condenser 10 is shown by using a perspective cross sectional view. FIG. 7 is a cross sectional view taken along the line C-C shown by the arrows in FIG. 3. The backflow prevention cover 38 is formed in a conical umbrella, and is attached to an upper end of the vapor discharge pipe 17 so as to cover the vapor discharge pipe 17. As shown by the dashed arrows, the vapor bypasses the backflow prevention cover 38 to be sucked into the vapor discharge pipe 17.

Since the backflow prevention cover 38 is attached, in the event that the liquid trapped by the fine grooves 35 splashes out of the fine grooves 35, it is possible to prevent the liquid from being mixed into the vapor discharge pipe 17. The vapor of the volatile component sucked into the vapor discharge pipe 17 is cooled by the heat exchanger 95 for liquefaction. The liquefied volatile component is stored in the vapor liquid tank 97. At this time, the condensed-liquid-line adjusting valve 98 is provided for the line 81 through which the condensed liquid flows, and the liquid is prevented from flowing back to the condensed-liquid discharge pipe 18 by adjusting the valve 98.

According to the embodiment, since the liquid condenser has a static structure without movable portions, it is more reliable than that with movable portions. In addition, since the liquid raw material is continuously supplied for condensation in the flowing process, the processing capability thereof is improved. Further, since the volatile component generated when heating the liquid raw material flows into the processing space that is formed inside the groove-formed pipe and the nonvolatile, liquid-state condensed liquid becomes a thin membrane to flow downward in the grooves, the volatile component is not coupled again to the condensed liquid, thus improving the processing efficiency. Furthermore, since the temperature of the groove-formed pipe becomes higher at a lower position of the liquid condenser, there is no possibility that the volatile component is not condensed on the lower side, thus preventing the re-coupling to the condensed liquid.

In the embodiment, only by setting initial conditions, such as the flow rate of the condensed liquid and the temperature of the warm water, the control unit 200 automatically controls the whole process during the condensation process, and thus no operators are required. Since no operators are required, long-period continuous processing can be easily carried out. Further, since the control unit 200 includes storage means into which a production condition that was carried out once can be stored, it is possible to start the condensation process more quickly for the next time and later with good repeatability.

According to the embodiment, a single liquid condenser can be arranged or plural liquid condensers can be arranged in parallel. In addition, the liquid can be uniformly fed to the respective liquid condensers, the concentration of the liquid can be measured, and the flow-rate adjusting device is provided. Accordingly, a great amount of liquid can be automatically condensed to a predetermined concentration.

What is claimed is:

1. A liquid condensation system that heats a liquid raw material under a decompressed circumstance and evaporates a volatile component from a liquid surface to condense the liquid raw material, the system comprising:
    liquid condensers, each of which condenses the liquid raw material;
    a vacuum pump that is in communication with the liquid condensers;
    a warm fluid circulation system as a heating source that heats the liquid raw material in the liquid condensers with a warm fluid in the warm fluid circulation system;
    vapor lines through which the volatile component evaporated in the liquid condensers is led to the outside of the liquid condensers;
    condensed-liquid lines through which the condensed liquid that is not evaporated in the liquid condensers is led to the outside of the liquid condensers;
    condensed-liquid-line adjusting valves that are interposed on the condensed-liquid lines;
    heaters attached to the condensed-liquid lines; and
    a control unit that controls the heaters and the condensed-liquid-line adjusting valves,
    wherein each of the liquid condensers has a double-cylinder structure having an outer pipe and an inner pipe, and is structured in such a manner that: the axis of the cylinder is arranged in a vertical axis direction; a cylindrical space where a warm fluid led from the warm fluid circulation system flows is formed between the outer pipe and the inner pipe; a plurality of grooves extending in the axis direction are formed on an inner circumferential face of the inner pipe; a hollow vapor-discharge-pipe, one end of which protrudes inside a processing space that is formed inside the inner pipe and the other end of which extends to the outside from the inner pipe, is arranged at a lower portion of the inner pipe; a supplying pipe through which the liquid raw material is supplied to the groove portions of the inner pipe is formed at an upper portion of the inner pipe; a condensed-liquid discharge pipe through which the separated condensed liquid is discharged is provided at a position that is located at a lower portion of the inner pipe and is different from that where the vapor discharge pipe is arranged; the vapor line is connected to the vapor discharge pipe; and the condensed-liquid line is connected to the condensed-liquid discharge pipe.

2. The liquid condensation system according to claim 1, wherein an upper lid for a groove-formed pipe that is engaged with an upper end of the inner pipe is provided, a plurality of land portions are arranged in a radial manner on an upper surface of the upper lid for the groove-formed pipe, and a buffer portion is formed in the middle of the plurality of land portions.

3. The liquid condensation system according to claim 1, wherein the condensed-liquid line further includes a condensed-liquid tank and a discharge pump that supplies the condensed liquid stored in the condensed-liquid tank to the outside, further includes temperature-adjusting temperature sensors that are provided between the liquid condensers and the condensed-liquid-line adjusting valves, between the condensed-liquid-line adjusting valves and the condensed-liquid tank, and to the condensed-liquid tank, and the control unit controls the heaters and the condensed-liquid-line adjusting valves on the basis of outputs from the temperature-adjusting temperature sensors.

4. The liquid condensation system according to claim 1, wherein a backflow prevention cover formed in an umbrella shape is attached to an end portion of the vapor discharge pipe on the liquid condenser-side.

5. The liquid condensation system according to claim 4, wherein a plurality of the liquid condensers are provided and are operable in parallel.

6. The liquid condensation system according to claim 1, wherein a plurality of the liquid condensers are provided and are operable in parallel.

7. A liquid condensation system that heats a liquid raw material under a decompressed circumstance and evaporates a volatile component from a liquid surface to condense the liquid raw material, the system comprising:
   liquid condensers, each of which condenses the liquid raw material;
   a vacuum pump that is in communication with the liquid condensers;
   a warm fluid circulation system as a heating source that heats the liquid raw material in the liquid condensers with a warm fluid in the warm fluid circulation system;
   a raw material buffer from which the liquid is fed to each liquid condenser;
   a raw material supplying pump that supplies the raw material to the raw material buffer;
   vapor lines through which the volatile component evaporated in each of the liquid condensers that are connected in parallel to the raw material buffer is led to the outside of the liquid condensers;
   condensed-liquid lines through which the condensed liquid that is not evaporated in the liquid condensers is led to the outside of the liquid condensers;
   condensed-liquid-line adjusting valves that are interposed on the condensed-liquid lines;
   a temperature-adjusting heater that is attached to the condensed-liquid lines; and
   a control unit that controls the temperature-adjusting heater and the condensed-liquid-line adjusting valves,
   wherein each of the liquid condensers has a structure having an outer pipe and an inner pipe overlapped, and is structured in such a manner that: warm fluid is led from the warm fluid circulation system to between the outer pipe and the inner pipe; the inside of the inner pipe is made to be under a decompressed circumstance by using the vacuum pump; the liquid raw material in a thin membrane state that falls along a plurality of grooves that are formed on an inner circumference of the inner pipe and extend in the axis direction is evaporated by heat exchange with the warm fluid; and generated vapor is led to a vapor discharge pipe inserted into the inner pipe and a non-evaporated liquid is led to a condensed-liquid discharge pipe arranged at a lower portion of the inner pipe for condensation of the liquid raw material.

8. The liquid condensation system according to claim 7, wherein each of the liquid condensers is structured in such a manner that an upper lid for a groove-formed pipe that accepts a supplied liquid is arranged at an upper end of the inner pipe, a plurality of grooves in a radial manner are formed on the upper lid for the groove-formed pipe, the liquid is fed to the whole circumference of the inner pipe by using capillary phenomenon, and substantially uniform thin membranes are formed in the grooves formed on an inner circumferential face of the inner pipe.

* * * * *